(12) United States Patent
Hu et al.

(10) Patent No.: US 6,989,426 B2
(45) Date of Patent: Jan. 24, 2006

(54) METHODS FOR PRODUCING DI-BLOCK POLYMERS

(75) Inventors: Jinlian Hu, Hung Hom (CN); Subrata Mondal, Hung Hom (CN)

(73) Assignee: The Hong Kong Polytechnic University, Hong Kong Sar (CN)

( * ) Notice: Subject to any disclaimer, the term of this patent is extended or adjusted under 35 U.S.C. 154(b) by 195 days.

(21) Appl. No.: 10/459,587

(22) Filed: Jun. 12, 2003

(65) Prior Publication Data

US 2004/0254317 A1     Dec. 16, 2004

(51) Int. Cl.
*C08F 4/44*      (2006.01)
*C08F 116/12*    (2006.01)
*C08F 232/08*    (2006.01)

(52) U.S. Cl. ...................... 526/171; 526/172; 526/280; 526/332

(58) Field of Classification Search ............... 526/171, 526/172, 280, 332
See application file for complete search history.

(56) References Cited

U.S. PATENT DOCUMENTS 6,417,270 B1 *  7/2002  Wollum et al. ............... 525/98

* cited by examiner

*Primary Examiner*—Robert D. Harlan
(74) *Attorney, Agent, or Firm*—Jacobson Holman PLLC

(57) ABSTRACT

The current major way of making nanofibers is electrospinning. However, the minimum fiber diameter is limited to be about 300–500 nm, which is not compliant with the physical definition of nano structures (in the region of 1 to 100 nm). Futher, the productivity is relatively low. This invention provides a method for manufacturing a nano-sized di-block polymer including at least a hard-segment polymer and a soft-segment polymer. First, a sample containing the hard-segment polymer, the soft-segment polymer, and a catalyst is dissolved in a first solvent. Then the dissolved sample is cast on substrate, and then the first solvent to is removed form a dried sample. Finally, the nano-sized di-block polymer is formed by crew-cutting.

16 Claims, No Drawings

METHODS FOR PRODUCING DI-BLOCK POLYMERS

FIELD OF THE INVENTION

This invention relates to methods for producing di-block polymers and di-block polymers formed therefrom, particularly although not necessarily solely, those di-block polymer fibres have shape-memory function having a diameter of 1 nm to 150 nm.

BACKGROUND OF THE INVENTION

"Shape-memory" refers to the ability of certain materials to remember a shape after deformation in response to various environmental changes such as temperature changes. There are a number of polymers that exhibit shape-memory effect, for example polynorbomene, polyisoprene, polyurethane, and so on. Such shape-memory polymers are usually formed of two segments, namely one soft segment and one hard segment, so that a melt of such two segments may have micro phase separation. The microdomains of the hard-segment may be distributed in the matrix formed by the soft segment if the soft segment is in excess, or vice versa. Typically, the size of each hard-segment domain may be in the region of 1 to 100 nm. The domain structures may depend on the composition, and the relative amount and length of the two hard- and soft-segments.

Generally, a nanofiber can be defined as a structure having a large length to diameter ratio. If such fibers are used in apparel or in medical or biological areas, they should be soft and long enough for certain processing. Currently, the major way of making nanofibers is electrospinning. However, such a method may suffer from two limitation: 1) the minimum fiber diameter is limited to be about 300–500 nm, which is not compliant with the physical definition of nano structures (in the region of 1 to 100 nm) and the resulting fiber may not have the required small size effect, quantum effect and so on that is expected from a nanofiber; 2) the productivity is relatively low.

OBJECTS OF THE INVENTION

Therefore, it is an object of this invention to resolve at least one or more of the problems as set forth in the prior art. As a minimum, it is an object of this invention to provide the public with a useful choice.

SUMMARY OF THE INVENTION

Accordingly, this invention provides a method for manufacturing a di-block polymer including at least a hard-segment polymer and a soft-segment polymer. First, a sample containing the hard-segment polymer, the soft-segment polymer, and a catalyst is dissolved in a first solvent. Then the dissolved sample is cast on substrate, and then the first solvent to is removed form a dried sample. Finally, the di-block polymer is formed by crew-cutting.

In one embodiment of this invention, the hard-segment polymer is a polymer of cycloolefin, which can be selected from the group consisting of norbomene, norbomadiene, clyclopentane, diclopentadiene, clyclo-octane, tetracyclododecene, cyclodocene, 1,3-cyclooctadiene, 1,5-cyclooctadiene, and 1,3-cyclopentadiene.

In another embodiment of this invention, the soft-segment polymer is poly (alkylene glycol), which can be selected from the group consisting of poly(ethylene glycol), poly(ethylene oxide), polypropylene 1,2-glycol, polypropylene oxide and polypropylene 1,3-glycol.

More preferably, the hard-segment polymer is polynorbomene, and the soft-segment polymer is polyethylene oxide.

Optionally, the catalyst is selected from the group consisting of bis(tricycolhexylphosphine)-benzylideneruthenium dichloride $\{Cl_2Ru(CHPh)[P(C_6H_{11})_3]_2\}$, vinylideneruthenium complex bearing a hydridtris (pyrazoyl) borate ligand, $TpRuCl(=C=CHPh)(PPh_3)$, $Mo(CH\text{-}t\text{-}Bu)(NAr)(OCMe_3)_2$ and $Mo(CHCPhMe_2)(NAr)(OCMe(CF_3)_2)_2$.

Preferably, the hard-segment polymer has a volume fraction of 20% to 50%, and the soft-segment polymer has a volume fraction of 80% to 50%, in the dried sample.

Preferably, the molar ratio of the monomet in a hard-scgmcnt polymer and the soft-segment polymer to the catalyst is 500:1 to 1500:1.

The first solvent is preferred to be evaporated at or above 50° C. under an inert atmosphere to form the dried sample, and more preferably at 50° C. for one day to form the dried sample.

After the first sample, it may be advantageous to further include the step of annealing the dried sample for 12 hours by heating the dried sample under vacuum or an inert atmosphere, preferably by heating the dried sample is heated at 150 to 180° C. for 12 hours.

The step of forming di-block polymer by crew-cutting including the steps of:
  dissolving the dried sample in second solvent and maintaining at a temperature range, for which the second solvent may be tetrahydrofuran or dimethylformamide, or the mixtures thereof;
  inducing aggregation by either lowering temperature or adding a hydrophobic solvent or water to the second solvent, wherein the temperature may be 60° C. to 80° C.; and
  extracting the di-block polymer from the second solvent.

It is another aspect of this invention to provide a di-block polymer including at least a hard-segment polymer and a soft-segment polymer manufactured by the above methods.

DETAILED DESCRIPTION OF THE PREFERRED EMBODIMENT

Objects, features, and aspects of the present invention are disclosed in or are obvious from the following description. It is to be understood by one of ordinary skill in the art that the present discussion is a description of exemplary embodiments only, and is not intended as limiting the broader aspects of the present invention, which broader aspects are embodied in the exemplary constructions.

A block copolymer consists of two or more chemically distinct segments (i.e., blocks) joined together to form single macromolecules. Di-block copolymers are composed of two chemically distinct segments. Here, a soft-segment is one segment and a hard-segment is another. The final shape memory polymer is formed by two kind of building blocks i.e. soft- and hard-segment.

-A-A-A-A-A-A-A-A-A-A-A-B-B-B-B-B-B-B-B-B-B-B-

|←Soft Segment or block→|←Hard Segment or Block→|

The first step in making the di-block polymer of tibs invention is to dissolve a sample containing the hard-segment polymer, the soft-segment polymer, and a catalyst in a first solvent.

The hard-segment polymer used in this invention can be any polymer having a molecular weight of 1.1 to $5.5 \times 10^4$, modulus in the range of 1.5 to 3 GPa, and a glass transition temperature of about 200 to 280° C. Suitable examples of the hard-segment polymer may be a polymer of cycloolefin, including norbornene, norbornadiene, clyclopentane, diclopentadiene, clyclo-octane, tetracyclododecene, cyclodocene, 1,3-cyclooctadiene, 1,5-cyclooctadiene, and 1,3-cyclopentadiene. The hard-segment polymer may be preferred to have a volume fraction of 20% to 50% in the dried sample.

The soft-segment polymer used in this invention can be any polymer having a molecular weight of 1000 to 10000, and a glass transition temperature of about −60° C. Suitable examples of the soft-segment polymer may be a poly (alkylene glycol), including poly(ethylene glycol), poly(ethylene oxide), polypropylene 1,2-glycol, polypropylene oxide and polypropylene 1,3-glycol. The soft-segment polymer may be preferred to have a volume fraction of 80% to 50% in the dried sample.

The catalyst used in this invention can be any one of bis(tricycolhexylphosphine)-benzylidenenithenium dichloride $\{Cl_2Ru(CHPh)[P(C_6H_{11})_3]_2\}$, vinylideneruthenium complex bearing a hydridtris pyrazoyl) borate ligand, $TpRuCl(=C=CHPh)(PPh_3)$, $Mo(CH\text{-}t\text{-}Bu)(NAr)(OCMe_3)_2$ and $Mo(CHCPhMe_2)(NAr)(OCMe(CF_3)_2)_2$. Of course, other catalyst know in the art that catalyze polymerization can also be used, for example vinylideneruthenum complex bearing a hydridtris(pyrazol)borate ligand, $TpRuCl(=C=CHPh)(PPh_3)$. The catalytic activity of this system may be enhanced by addition of Lewis acid such as $BF_3.Et_2O$. Other catalyst that can be used for polymerization may include $MoCl_5$ or $WCl_6$ with alkyl aluminum halide (cocatalyst) [P. J. Minchak, U.S. Pat. No. 4,138,448]. Addition of a third component (water, alcohol or phenol), known as activator, was found to improve the catalyst efficiency. The amount of the catalyst required, as usual, is relatively small. Typically, the molar ratio between the monomers in the hard- and soft-segment polymer to the catalyst may be in the region of 500 to 1500:1.

The first solvent shall of course be able to dissolve all of the components required However, as a skilled person may know, the identity of the solvent may vary if different components are used, which can be found by routine trial and error. As an example, if the hard-segment polymer is polynorbomene, and the soft-segment polymer is polyethylene oxide, toluene may be used as the first solvent. After the casting step, the dried sample may be formed by evaporating the first solvent at or above 50° C., preferably under an inert atmosphere for one day.

Typically, the hard-segment polymer can have a volume fraction of 20% to 50%, and the soft-segmnent polymer has a volume fraction of 80% to 50%, in the dried sample.

When the hard-segment and soft-segment polymers are dissolved in toluene and casted on a suitable substrate like glass plate, the hard- and soft-segments may be contained in di-block copolymer arranged randomly. Phase separation of segmented (hard segment and soft segment) di block copolymer may be controlled by the subsequent "annealing conditions", which refers to the heating of polymer, preferably under vacuum or in an inert atmosphere (to prevent oxidation), at specific temperature. During annealing crystalline structure would be developed in the polymeric material. When the polymers are heated to temperatures just below the melting temperature there is an increase in lameilar crystal thickness. Annealing may lead to increases in degree of crystallinity and to perfection and size of crystallites, which lead to an improvement in mechanical properties and certainly stabilization of the structural and dimensional properties of the polymeric flmzn. By proper annealing condition (for example time, temperature and vacuum), the hard and soft segments can arranged properly, as the incompatibility between the constituent structure a micro phase separated structure would be obtained, for example the hard segment is hydrophobic and soft segment is hydrophilic. However, different combinations of hard- and soft-segments may alter the temperature required, and the need of a vacuum or an inert atmosphere, which may be obtained by routine trial and error. It was found that a suitable range is to anneal the dried sample for 12 hours by heating the dried sample under vacuum or an inert atmosphere, preferably at 150 to 180° C. for 12 hours.

Next, the step of "crew-cutting" is carried. The first step involved is dissolving the dried sample in a second solvent and maintaining at a temperature range to dissolve all of the dried sample in the second solvent to dissolve the soft segment matrix. The second solvent shall be a good solvent for soft segment, i.e., the soft segment is substantially soluble therein. Suitable second solvents may be tetrahydrofuran or dimethylformamide or their mixtures, and the temperature may be 60° C. to 80° C. However, again, the identity of the second solvent and the temperature may be varied due to the materials used, which may be obtained through trial and error.

The second step in the "crew-cutting" step is to induce aggregation, which may be accomplished by either lowering the temperature or adding a hydrophobic solvent or water to the second solvent. When amphiphilic (contain hydrophobic and hydrophilic component, e.g. polynorbornene is hydrophobic and PEG hydrophilic) diblock copolymer, dissolve in a solvent which is a solvent compatible to only one of the soft-segment or hard-segment, can form nanosized aggregates as a result of the self-assembly of the less soluble segment, Choosing between lower temperature or adding a hydrophobic solvent should be determined by the identities of the components involved. Finally, the di-block polymer is extracted by a usual extraction method including filtration or centrifuging.

An example of the di-block polymer produced is polynorborene nano fiber. Diameter of such a fiber is in the range of 40–200 nanometer and the length is about 200–1200 nanometer.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

What is claimed is:

1. A method for manufacturing a di-block polymer including at least a hard-segment polymer and a soft-segment polymer, including the steps of:

dissolving a sample containing the hard-segment polymer, the soft-segment polymer, and a catalyst in a first solvent;

casting the dissolved sample on substrate, and then removing the first solvent to form a dried sample; and forming the di-block polymer by crew-cutting including the steps of:

dissolving the dried sample in a second solvent and maintaining at a temperature range;

inducing aggregation by either lowering temperature or adding a hydrophobic solvent or water to the second solvent; and extracting the di-block polymer from the second solvent.

2. The method of claim 1, wherein the hard-segment polymer is a polymer of cycloolefin.

3. The method of claim 2, wherein the cycloolefin is selected from the group consisting of norbornene, norbornadiene, clyclopentano, diclopentadiene, clyclo-octane, tetracyclododecene, cyclodocene, 1,3-cyclooctadiene, 1,5-cyclooctadiene, and 1,3-cyclopentadiene.

4. The method of claim 1, wherein the soft-segment polymer is poly (alkylene glycol).

5. The method of claim 4, wherein the poly (alkylene glycol) is selected from the group consisting of poly(ethylene glycol), poly(ethylene oxide), polypropylene 1,2-glycol, polypropylene oxide and polypropylene 1,3-glycol.

6. The method of claim 1, wherein the hard-segment polymer is polynorbornene, and the soft-segment polymer is polyethylene oxide.

7. The method of claim 1, wherein the catalyst is selected from the group consisting of bis(tricycolhexylphosphine)-benzylideneruthenium dichloride $\{(Cl_2Ru(CHPh)[P(C_6H_{11})_3]_2\}$, vinylideneruthenium complex bearing a hydridtris (pyrazoyl) borate ligand, $TpRuCl(=C=CHPh)(PPh_3)$, $Mo(CH-t-Bu)(NAr)(OCMe_3)_2$ and $Mo(CHCPhMe_2)(NAr)(OCMe(CF_3)_2)_2$.

8. The method of claim 1, wherein the hard-segment polymer has a volume fraction of 20% to 50%, and the soft-segent polymer has a volume fraction of 80% to 50%, in the dried sample.

9. The method of claim 1, wherein the molar ratio of the monomer in a hard-segment polymer and the soft-segment polymer to the catalyst is 500:1 to 1500:1.

10. The method of claim 1, wherein the first solvent is evaporated at or above 50° C. under an inert atmosphere to form the dried sample.

11. The method of claim 10, wherein the first solvent is evaporated at 50° C. for one day to form the dried sample.

12. The method of claim 10 further including the step of annealing the dried sample for 12 hours by heating the dried sample under vacuum or an inert atmosphere.

13. The method of claim 12, wherein the dried sample is heated at 150 to 180° C. for 12 hours.

14. The method of claim 1, wherein the second solvent is tetrahydrofuran or dimethylformamide, or the mixtures thereof.

15. The method of claim 1, wherein the temperature is 60° C. to 80° C.

16. A di-block polymer including at least a hard-segment polymer and a soft-segment polymer manufactured by the method of claim 1.

* * * * *